Figure 4:
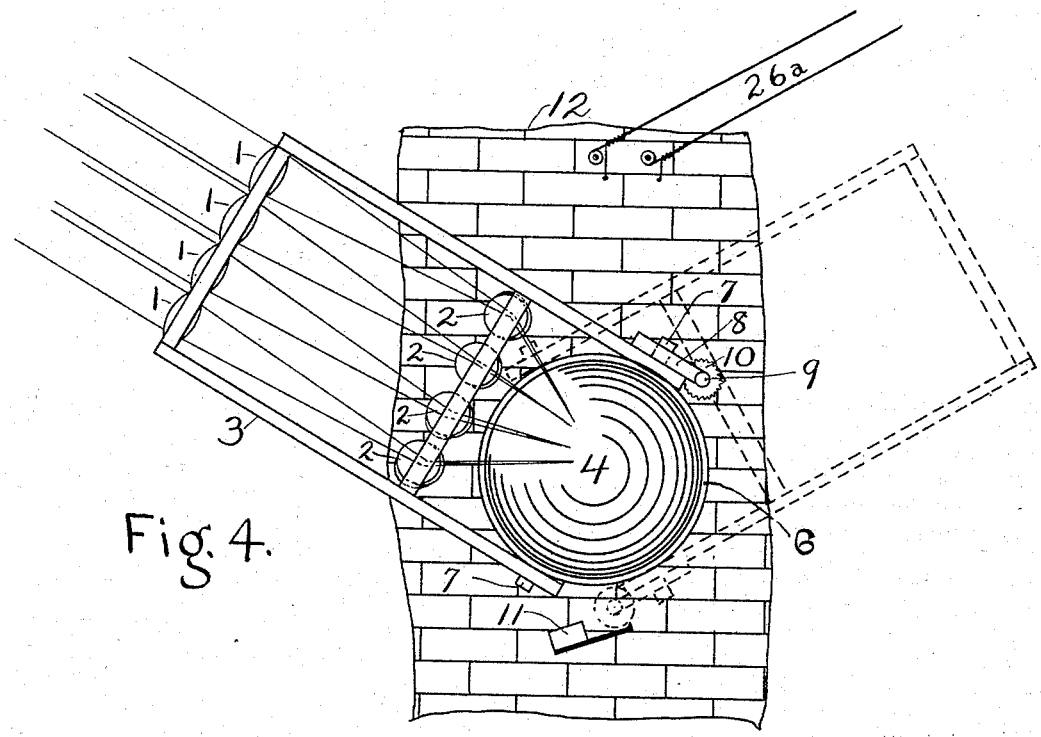

(No Model.) 2 Sheets—Sheet 1.
M. L. SEVERY.
APPARATUS FOR UTILIZING SOLAR HEAT.
No. 496,959. Patented May 9, 1893.
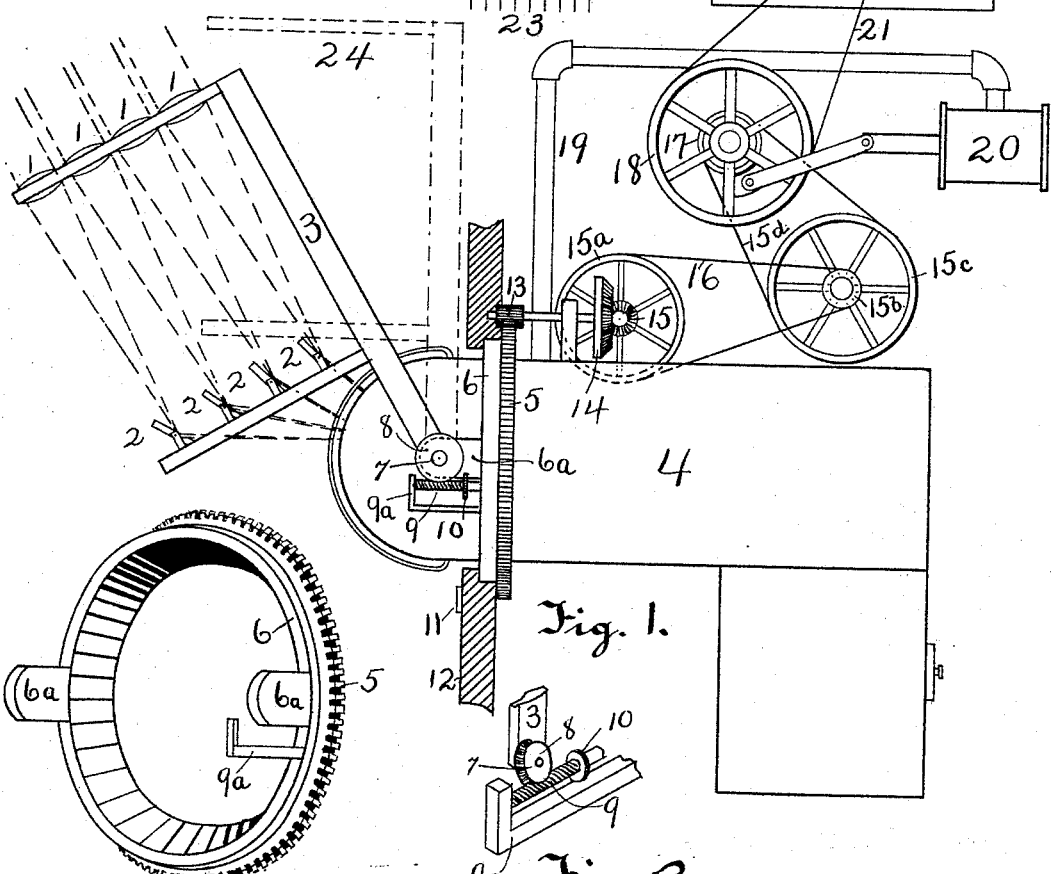
Witnesses.
D. W. Allen.
E. H. Granger.
Inventor.
Melvin L. Severy,
by Howe & Kellogg.
attys.

(No Model.) 2 Sheets—Sheet 2.
M. L. SEVERY.
APPARATUS FOR UTILIZING SOLAR HEAT.
No. 496,959. Patented May 9, 1893.

Witnesses.
Alfred Q. Cole.
M. E. Keefe.

Inventor.
Melvin L. Severy
by Howe & Kellogg.
his Attys.

UNITED STATES PATENT

MELVIN L. SEVERY, OF BOSTON, ASSIGNOR, BY DIRECT AND MESNE ...
MENTS, TO HIMSELF AND FRANCIS DOANE, OF NORWOOD, AND CHAR...
F. CROWELL, OF BOSTON, MASSACHUSETTS, TRUSTEES.

APPARATUS FOR UTILIZING SOLAR HEAT.

SPECIFICATION forming part of Letters Patent No. 496,959, dated May 9, 1893.

Application filed March 26, 1892. Serial No. 426,585. (No model.)

*To all whom it may concern:*

Be it known that I, MELVIN L. SEVERY, of Boston, in the county of Suffolk and State of Massachusetts, have invented certain new and useful Improvements in Apparatus for Utilizing Solar Heat, of which the following, taken in connection with the accompanying drawings, is a specification.

The object of my invention is to provide an improved apparatus for utilizing solar heat.

In carrying my invention into effect, I accomplish this object: first, by combining with a boiler or other heat receiver a device for concentrating the rays of the sun upon the boiler or heat receiver, which device is given a movement corresponding to the diurnal path of the sun and also a movement corresponding to its movement in the elliptic whereby the full effect of the sun's rays will be constantly and automatically maintained upon the concentrating device; and second, by effecting these movements of the concentrating device by means operated by the power obtained from the boiler or heat receiver; all of which is hereinafter described and particularly pointed out in the claims.

In the accompanying drawings, representing an embodiment of the invention, Figure a side elevation of the apparatus; Fig. enlarged perspective of the collar 6. Fig. 3 illustrates the frame concentrating device of the worm 9 and the a portion of a build- and showing and reflec- Mounted on the projections $6^a$ by means of pivots 7 is a frame 3 carrying refractors 1 and reflectors 2, the said refractors and reflectors being so placed in the frame with respect to each other that the convergent rays from the refractors will fall upon the hemi-spheri... them be directed upon the reflectors and b end of the boiler. Rigidly secured to frame 3 is a worm wheel 8 which enga... worm 9 rotatably supported in a brac... fastened to the collar 6. A toothed w... is secured to the worm 9 and is ad... engage a fixed dog 11 by the rotati... collar.

Engaging the gear teeth 5, is a ... the end of a shaft having a be... which in turn is meshed with a ... fixed to a pulley $15^a$. A belt ... pulley $15^a$ and a small pulley $15^c$, wh... with a larger pulley $15^c$ on th... to a small pulley 17 on th... of which 18 is the fly whe... The cylinder 20 of the from the boiler throug... 22 is an electric dy... which is belted to ... 21. The dynamo mercial purpose. generated by t... storage batter... the dynamo ... insufficienc... boiler.

26 are w... the stor... ing to ...

As ... prov... ati...

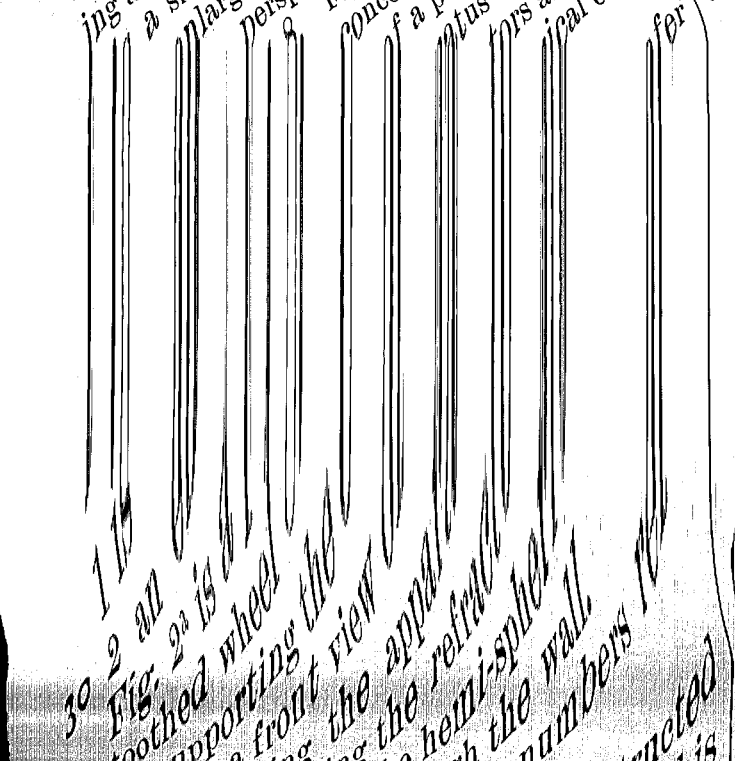

ack or other suitable absorption of the heat. The water within the boiler or heat receiver being directed against and upon the boiler or heat receiver and steam, which operates the engine 20 and the engine, by means of fly wheel 18, pulley 17, belt 15ᵈ, pulleys 15ᶜ and 15ᵇ, belt 16, pulleys 15ᵃ, bevel gears 15 and 14, pinion 13 and gear teeth 5, turns the collar 6, and with it the frame 3 which imparts to the concentrator a movement co-incident with the diurnal path of the sun. On every complete revolution of the collar the toothed wheel 10 strikes the dog 11 and is moved thereby. The wheel 8 that any predetermined movement of declination is to be so proportioned to each other and to the toothed worm wheel 8 and the worm 9 are to be so proportioned to cause it to follow the movement of the sun in the ecliptic. It will thus be seen that the concentrating devices will automatically be given a movement that will always keep the concentrator opposed to the movement of the earth in the ecliptic. During its diurnal motion and also during its movement of the earth in the ecliptic. Although the drawings do not show accurately the relative proportions of the pulleys, pinions necessary to cause the wheels to follow the movements of the sun, within the determination of these parts their proper and desire to secure by Letters Patent is:—

1. In an apparatus for utilizing solar energy, the combination with a heat receiver, of a device for concentrating rays from the sun upon the receiver, means for automatically moving the concentrator to keep it opposed to the rays during the diurnal motion of the sun, and means for automatically varying the position of the concentrator to keep it opposed to the rays during the movement of the earth in the ecliptic.

3. In an apparatus for utilizing solar energy, the combination with a heat receiver, of a rotatable support or collar 6, a device for concentrating the rays upon the receiver and supported by the collar, the said parts being so arranged that the rotation of the collar will impart to the concentrator a movement co-incident with the diurnal path of the sun, substantially as shown and described.

4. In an apparatus for utilizing solar energy, the combination with a heat receiver, of a rotatable support or collar 6, a device for concentrating the rays upon said receiver and supported by the collar, the said parts being so arranged that the rotation of the collar will impart to the concentrator a movement co-incident with the diurnal path of the sun, and means operated by said collar or support for varying the position of the concentrator to keep it opposed to the rays during the movement of the earth in the ecliptic.

5. In an apparatus for utilizing solar energy, the combination with a heat receiver, a rotatable support or collar 6, a frame 3 hinged to the collar and carrying a device for concentrating the rays upon the receiver, the worm-wheel 8, the worm 9, toothed wheel 10, and dog 11, substantially as shown and described.

In testimony whereof, I have signed my name to this specification, in the presence of two subscribing witnesses, on this 19th day of March, A. D. 1892.

MELVIN L. SEVERY.

Witnesses:
GEORGE A. PRATT,
GEO. H. RICHARDS.